United States Patent [19] [11] 4,421,870
Stutz et al. [45] Dec. 20, 1983

[54] PROCESS FOR THE PREPARATION OF CELLULAR POLYURETHANE ELASTOMERS BASED ON 4,4'-DIISOCYANATO-1,2-DIPHENYLETHANE

[75] Inventors: Herbert Stutz, Karlsruhe; Karl H. Illers, Otterstadt; Herbert Haberkorn, Gruenstadt; Walter Heckmann, Weinheim, all of Fed. Rep. of Germany

[73] Assignee: BASF Aktiengesellschaft, Ludwigshafen, Fed. Rep. of Germany

[21] Appl. No.: 419,755

[22] Filed: Sep. 20, 1982

[30] Foreign Application Priority Data

Sep. 26, 1981 [DE] Fed. Rep. of Germany ....... 3138422

[51] Int. Cl.³ .............................................. C12P 7/16
[52] U.S. Cl. .................................................. 521/160
[58] Field of Search ......................................... 521/160

[56] References Cited

U.S. PATENT DOCUMENTS 3,933,701  1/1976  Puig et al. .......................... 521/160
3,960,788  6/1976  Cuscurida et al. .................. 521/160

Primary Examiner—Lucille M. Phynes
Attorney, Agent, or Firm—Joseph D. Michaels

[57] ABSTRACT

The invention relates to a method for the preparation of cellular polyurethane elastomers with densities of approximately 250 to 800 grams per liter by reacting 4,4'-diisocyanato-1,2-diphenylethane or a diisocyanato-1,2-diphenylethane isomer mixture with a 4,4'-diisocyanato-1,2-diphenylethane content of more than 95 percent by weight with higher molecular weight polyhydroxyl compounds and water, as well as optionally chain extenders in the presence of auxiliaries and/or additives according to the one-shot or preferably the prepolymer method in closed molds.

Compared with products based on 4,4'-diisocyanatodiphenylmethane, the polyurethane elastomer molded parts have improved physical and thermal properties.

9 Claims, No Drawings

PROCESS FOR THE PREPARATION OF CELLULAR POLYURETHANE ELASTOMERS BASED ON 4,4'-DIISOCYANATO-1,2-DIPHENYLETHANE

BACKGROUND OF THE INVENTION

1. Field of the Invention

This invention pertains to the field of cellular polyurethane elastomers. In particular it pertains to such elastomers having relatively high densities and superior thermal, mechanical and physical properties.

2. Description of the Prior Art

The preparation of cellular polyurethane elastomers by reacting higher molecular weight polyhydroxyl compounds such as polyesters or polyethers with organic diisocyanates into isocyanate-group containing prepolymers and the subsequent reaction with water to which auxiliaries may optionally be added is described in the *Plastics Handbook*, Vol VII, "Polyurethanes" by R. Vieweg and A. Hoechtlen, Carl Hanser Publishers, Munich 1966, pages 275–287 and 330–337.

According to a procedure in German Published Application 29 20 502, an isocyanate-containing prepolymer is reacted with higher molecular weight polyhydroxyl compounds, 0.3 to 1 percent by weight of water, 0.1 to 0.8 percent by weight of aromatic primary diamine with a molecular weight of 108 to 500, with the percent by weight in each case being based on the overall reaction mixture, and, optionally, glycols with a molecular weight of 62 to 250, in order to prepare the cellular polyurethane elastomers. Employing this procedure, products with relatively high densities can be produced without encountering excessive gas pressure during foaming.

Cellular polyurethane elastomers differ from polyurethane foams by their considerably higher densities which vary in the range of 100 to 800 grams per liter and their better physical properties which permit their use in applications not open to ordinarly lower density foams. They are therefore used for resiliency and absorption elements in vehicle and machine construction, for buffers, gaskets, shoe soles and similar purposes.

Because of the often extreme strain, primarily thermal and mechanical, under intended use conditions, generally high-performance polyurethane systems are required for cellular polyurethane elastomers. This results in several derived problems based on prior art. The systems based on 1,5-naphthalene diisocyanate, for example, result in elastomers with good properties but are very expensive. Those based on 3,3'-dichloro-4,4'-diamino diphenylmethane use are extremely dangerous physiologically and can therefore be made only with extreme precautionary measures. 4,4'-Diisocyanatodiphenylmethane, on the other hand, while safe to use and relatively inexpensive, results in cellular polyurethane elastomers which usually cannot meet the extreme mechanical requirements.

SUMMARY OF THE INVENTION

It now has been found that cellular polyurethane elastomers with extremely good mechanical properties can be obtained from 4,4'-diisocyanato-1,2-diphenylethane.

Thus, this invention is a method for the preparation of cellular polyurethane elastomers by reacting (a) an organic polyisocyanate with (b) higher molecular weight polyhydroxyl compounds and (c) water as well as, optionally, (d) chain extenders in the presence of (e) auxiliaries and/or additives in closed molds wherein 4,4'-diisocyanato-1,2-diphenylethane or a diisocyanato-1,2-diphenylethane isomer mixture containing at least 95 percent by weight of 4,4'-diisocyanato-1,2-diphenylethane is used as the organic polyisocyanate.

Cellular polyurethane elastomers of 4,4'-diisocyanato-1,2-diphenylethane in comparison with products of comparable compositions based on 4,4'-diisocyanatodiphenylmethane excel by their markedly improved physical and dynamic properties. This finding could not be anticipated in any manner since it could not be expected that an extension of the bridgemember between the two phenyl radicals by one methylene group would alter the properties of the resultant polyurethane elastomer molded part in such a drastic manner.

DESCRIPTION OF THE PREFERRED EMBODIMENTS

Materials Used (a) According to the invention and as already described, the cellular polyurethane elastomers are produced from 4,4'-diisocyanato-1,2-diphenylethane. Other suitable substances include mixtures of 4,4'-diisocyanato-1,2-diphenylethane with the 2,4'- and/or 2,2'-diisocyanato-1,2-diphenylethane isomers if the content of the 4,4'-isomer in the mixture represents more than 95 percent by weight, preferably more than 97 percent by weight.

(b) Suitable higher molecular weight polyhydroxyl compounds have molecular weights of from 700 to 10,000, preferably from 800 to 5,000, and functionalities of 2 to 6, preferably 2 to 3. It may also be advantageous to use small quantities of added monofunctional hydroxyl compounds. However, these may be used only in such quantities that the average functionality does not drop below two hydroxyl groups per molecule.

Examples of higher molecular weight polyhydroxyl compounds include: hydroxyl group-containing polyesters, polyester amides, polyethers, polyesters based on di- or polyglycols, polyacetals and polythioethers. Preferably used are the essentially linear hydroxyl group-containing polyesters with molecular weights between 800 and 5000.

Suitable hydroxyl group-containing polyesters may be produced, for example, from organic dicarboxylic acids with 2 to 12, preferably 4 to 8 carbon atoms, and multi-functional alcohols. Hydroxyl group-containing polyester amides are obtained, for example, from amino alcohols or mixtures of multifunctional alcohols and amino alcohols and/or diamines and the mentioned dicarboxylic acids. The dicarboxylic acids may be aliphatic, cycloaliphatic, aromatic or heterocyclic in nature. They may be saturated or unsaturated and may, optionally, be substituted, for example, by halogen atoms.

Examples include aliphatic dicarboxylic acids such as succinic acid, glutaric acid, adipic acid, sebaric acid, azelaic acid and sebasic acids; aromatic dicarboxylic acids such as phthalic acid, isophthalic acid, terephthalic acid, and naphthalene dicarboxylic acid; cycloaliphatic dicarboxylic acids such as hexahydrophthalic acid, or endomethylenetetrahydrophthalic acid, and unsaturated dicarboxylic acids such as maleic or fumaric acid.

The dicarboxylic acids may be used individually or, when more than one acid is used, in form of any desired mixture with each other or in sequence. For the preparation of the hydroxyl group-containing polyesters it may optionally be advantageous to use the appropriate carboxylic acid derivatives such as carboxylate esters with 1 to 4 carbon atoms in the alcohol radical, carboxylic anhydrides or carboxylic acid chlorides instead of the free carboxylic acids.

Examples for multifunctional alcohols are diols with 2–16, preferably 4–6 carbon atoms, which may optionally contain heteroatoms and/or may be substituted such as ethylene glycol, propylene glycol, trimethylene glycol, 1,2-, 1,3-, 1,4- and 2,3-butanediol, 1,5-pentanediol, 1,6-hexanediol, 1,8-octanediol, 1,10-decanediol, neopentylglycol, 2-methyl-1,3-propanediol, 3-methyl-1,5-pentanediol, N-methyldiethanolamine, bis(2-hydroxyethoxy)benzene, 4,4'-bis(hydroxyethoxy)-2,2-diphenylpropane, diethylene glycol, dipropylene glycol and dibutylene glycol and their higher homologs as well as hydroxyl group-containing polyethers with molecular weights between approximately 500 and 2000.

Small quantities of tri- and/or higher functional alcohols such as glycerine, trimethylolpropane, hexanetriol, triethanolamine, tripropanolamine, pentaerythritol and similar substances may be used in making polyesters with high functionalities. Suitable amino alcohols and diamines are, for example, ethanolamine, propanolamine, N-methylethanolamine, ethylenediamine, hexamethylenediamine or piperazine, which may be used in quantities of up to 20 percent of the diol component.

Suitable hydroxyl group-containing polyesters may also be prepared by reaction of small amounts of the aforementioned multifunctional alcohols with, optionally substituted hydroxy acids or lactones such as, for example, $\epsilon$-hydroxycaproic acid or $\epsilon$-caprolactone.

Suitable higher molecular weight polyethers with 2–6, preferably 2–3 hydroxyl groups in the molecule, and molecular weights of 700 to 10,000, preferably of 800 to 5,000, are the addition products of alkalene oxides, such as ethylene oxide, propylene oxide, 1,2- and 2,3-butylene oxide, styrene oxide or epichlorohydrin obtained by reaction of the alkylene oxides or, optionally, in desired mixtures with each other or in sequence, with di- and/or higher functional starter molecules with 3–6 active hydrogen atoms in the molecule. Examples of such starter molecules are water, ammonium, multifunctional alcohols such as ethylene glycol, propylene glycol, butanediol, pentanediol, hexanediol, octanediol, decanediol, glycerine, trimethylolpropane, hexanetriol, pentaerythritol, sorbitol, hydroquinone, 4,4'-dihydroxy-2,2-diphenylpropane, 2,2-bis(4-hydroxylcyclohexyl)-propane; alkanolamines such as ethanolamine, N-alkylethanolamine, and multifunctional amines such as ethylenediamine, diethylenetriamine, piperazine and similar substances.

Also suited as higher molecular weight polyhydroxy compounds are addition products of cyclic ethers such as tetrahydrofuran, hexamethylene oxide, or octamethylene oxide as well as hydroxyl group-containing polybutadienes.

Preferred suitable polyacetals include water-insoluble formals such as poly(butanediol formal) or poly(hexanediol formal). To be mentioned among the polythioethers are particularly the condensation products of thiodiglycol with itself and/or with other glycols, dicarboxylic acids, aminocarboxylic acids and amino alcohols.

The higher molecular polyhydroxyl compounds suited according to this invention may already contain urethane and/or urea groups. Dispersions of natural or synthetic polymers or fine particled mineral suspensions in the above-mentioned polyhydroxyl compound may be used.

The higher molecular polyhydroxyl compounds may be used alone as well as in the form of any desired mixtures with each other or in sequence.

(c) For the preparation of cellular polyurethane elastomers, water is used as blowing agent which reacts with the isocyanate groups to form carbon dioxide. The amount of water which is advantageously used is 0.5 to 5 percent by weight, preferably 0.5 to 2.5 percent by weight, based on the weight of components (a), (b), and optionally (d).

(d) Suitable chain extenders which may optionally be used for the preparation of cellular polyurethane elastomers in accordance with the process of this invention and which have molecular weights below 500 are the diols and diamines known in accordance with the state of the art. Low molecular weight diols include, for example, the preferably linear diols mentioned above for the preparation of hydroxyl group-containing polyesters. Suitable diamines also include primary, preferably aromatic diamines and particularly those substituted by halogen, $C_1$–$C_4$alkyl, alkoxy, nitrile, ester, sulfone, sulfonate, nitro groups and similar deactivating groups. Examples include isomeric phenylene, toluene, and naphthalenediamines, 4,4'-, 2,4'-, and 2,2'-diaminodiphenylmethane, 4,4'-, 2,4'-, and 2,2'-diaminodiphenylethane, diesters of anthranilic acid, diaminobenzoate, diaminobenzenesulfonate, diesters of para-aminobenzoic acid with glycols, diaminobenzonitrile, disulfide or thioether group-containing diamines and similar substances.

The chain extenders may be used individually as well as in the form of diol, diamine or diol-diamine mixtures. If chain extenders are used, quantities of up to 0.3 moles, preferably of 0.02 to 0.2 moles per mole of higher molecular weight polyhydroxyl compound have proven to work well.

(e) As already explained, the cellular polyurethane elastomers may be prepared in the presence of auxiliaries and/or additives. Catalysts for accelerating the polyaddition between the diisocyanato-1,2-diphenylmethane isomers and the polyhydroxyl compounds, water and/or possibly chain extenders, for example, have proven to work well. Catalysts are normally used in quantities of 0.001 to 1.0 percent by weight based on the polyhydroxyl compound-the exact amount depends upon the reactivity of the components (a) to (d) and the technical and/or plant conditions. Examples include: tertiary amines such as triethylamine, dimethylcyclohexylamine, dimethylbenzylamine, tetramethylethylenediamine, N-alkylmorpholine, N,N'-dimethylpiperazine, diazabicyclooctane, N-alkyl substituted imidazoles, bis(dialkylaminoalkyl) ethers, and metal salts such as tin dioctoate, dibutyltin dilaurate, iron acetylacetonate, zinc or cobalt naphthanate, tetrabutyl orthotitonate and others. Particularly well suited are mixtures of the mentioned tertiary amines and metal salts.

In order to improve the foam structure, surfactant auxiliaries such as emulsifiers, foam stabilizers and cell regulators may also be used. Examples are siloxaneoxyalkylene copolymers and other organo polysiloxanes, sulfated derivatives and/or their alkali or ammonium salts of optionally oxyalkylated castor oil or oxyalkylated alkylphenols and/or these compounds themselves, dialkyl sulfosuccinates, oxyalkylated fatty alcohols, polyoxyalkylated esters, block copolymers of ethylene oxide and propylene oxide and similar substances.

In addition to this, other auxiliaries and/or additives in accordance with the state of the art may be used. Examples include stabilizers counteracting the effects of light, heat or discoloration, hydrolysis protection agents, bacteriostatic substances, fungicides, flame retardants, plasticizers, dyes, pigments, and organic or inorganic fillers.

More detailed data on the above-mentioned additional auxiliaries and additives are contained in the literature, for example, the monograph by J. H. Saunders and K. C. Frisch, *Polyurethanes*, Parts 1 and 2, Interscience, 1962 and 1964, ("High Polymer Series," vol. XVI).

Elastomer Preparation

The cellular polyurethane elastomers are produced in accordance with the one-shot and preferably the prepolymer method. In accordance with the one-shot method, the raw materials (a) through (c) as well as optionally (d) in the presence of auxiliaries and/or additives are intensively mixed at temperatures of 60° to 140° C., preferably 90° to 120° C. with the ratio of isocyanate groups of component (a) to Zerewitinoff active hydrogen atoms of components (b), (c), and optionally, (d) being 0.8 to 1.3, preferably 0.95 to 1.1. In an amount corresponding with the desired density of the molded part to be produced, the reactive mixture is introduced into the preheated molds at temperatures of 50° C. to 140° C., preferably of 50° C. to 90° C., the mold is closed, and the reaction mixture is allowed to cure. The resultant molded parts can be demolded after 2 to 45 minutes, preferably after 10 to 30 minutes, and may be post heated for several hours at temperatures of 80° C. to 140° C. in order to complete the reaction and to achieve optimum properties.

As already mentioned, the cellular polyurethane elastomer molded parts are preferably produced in accordance with the prepolymer method. For this purpose the 4,4'-diisocyanato-1,2-diphenylethane or diisocyanato-1,2-diphenylethane isomer mixture and the higher molecular polyhydroxyl compounds are reacted at temperatures of 60° C. to 160° C., preferably 80° C. to 150° C. for 0.5 to 6 hours, optionally, in the presence of catalysts in such quantities that the resultant prepolymers have an isocyanate content of 2 to 20 percent by weight, preferably of 3 to 10 percent by weight. The resultant prepolymer, which is storage stable at room temperature in the absence of moisture for several months, is then reacted with water or a mixture of water and chain extenders in the presence of auxiliaries and additives at the aforementioned temperatures in a second reaction step, resulting in cellular polyurethane elastomers.

According to a special variation, a prepolymer containing 3 to 20 percent by weight of isocyanate is produced from part of the higher molecular weight polyhydroxyl compound and the 4,4'-diisocyanato-1,2-diphenylethane or the isomer mixture, under the above-mentioned reation conditions. This substance is then reacted with a mixture of the remaining part of the higher molecular weight polyhydroxyl compound, water, and, optionally, chain extenders. The overall ratio of isocyanate groups of component (a) to the Zerewitinoff active hydrogen atoms of components (b), (c), and optionally (d), is 0.8 to 1.3, preferably 0.95 to 1.1 for the prepolymer method also.

Cellular molded parts are produced by a procedure analogous to that of the one-shot method. The reactive mixture consisting of the isocyanate group-containing prepolymers and water, or water and chain extender, or remainder of higher molecular polyhydroxyl compound, water, and optionally chain extender, is introduced into a mold, the mold is closed, and the reaction mixture is allowed to cure.

The cellular elastomers and/or molded parts thereof produced in accordance with this invention have densities of approximately 250 to 800 grams per liter. They have high mechanical and thermal properties and are therefore very well suited for resiliency and absorption elements, buffers, wheel covers, gaskets, shoe soles and similar applications where the material is exposed to extreme mechanical and thermal stress.

The invention is explained in greater detail in the following examples.

EXAMPLE 1

In a mixing vessel equipped with thermometer and vacuum connection, 500 grams (0.25 mole) of a commercially available polyester of adipic acid and ethylene glycol with an average molecular weight of 2000 (hydroxyl number 56) was melted and was dehydrated by being stirred for one hour at 100° C. and under 20 Torr. Subsequently, 140 grams (0.53 mole) of 4,4'-diisocyanato-1,2-diphenylethane was added at once and the mixture was reacted at 100° C. for one hour to result in the prepolymer. The prepolymer had an isocyanate content of 3.6 percent.

Three hundred (300) grams of this prepolymer was mixed intensively at a temperature of 90° C. with a mixture of 4.05 grams of a 50 percent aqueous solution of an emulsifier (sodium salt of a sulfated castor oil) and 0.01 gram triethylenediamine as catalyst using a high speed mixer and the foamable mass was poured into a mold heated to 70° C. The mold was closed and the mass was allowed to react. After 20 minutes the product was demolded and was post heated at 100° C. for 10 hours.

A cellular elastomer was obtained which had the following properties:

| | |
|---|---|
| Density | 440 grams/liter |
| Tear Strength[1] | 2.9 N/mm$^2$ |
| Breaking Elongation | 500% |
| Graves Tear Strength[2] | 14 N/mm |
| Compression Strength[3] | |
| at 20% Compression | 22 N/cm$^2$ |
| at 40% Compression | 38 N/cm$^2$ |
| at 60% Compression | 84 N/cm$^2$ |

[1]DIN 53571
[2]DIN 53575
[3]DIN 53577

EXAMPLE 2

In accordance with the general method described in Example 1, a prepolymer was produced from 450 grams (0.225 mole) of a commercially available polyester of adipic acid, ethylene glycol and 1,4-butanediol with an average molecular weight of 2000 and 112.5 grams (0.426 mole) of 4,4'-diisocyanato-1,2-diphenylethane.

The prepolymer had an isocyanate content of 3 percent and a viscosity of 7000 mPas at 90° C.

Three hundred (300) grams of this prepolymer were foamed as described in Example 1 with a mixture of 3.15 grams of the 50 percent aqueous emulsifier solution described in Example 1 and 0.01 gram of triethylenediamine. The mixture was mixed at 95° C., the mold temperature was 70° C., the molded part was post heated at 100° C. for six hours.

The resultant cellular elastomer had the following properties:

| Density | 510 grams/liter |
|---|---|
| Compression Strength | |
| at 20% Compression | 24 N/cm$^2$ |
| at 40% Compression | 44 N/cm$^2$ |
| at 60% Compression | 96 N/cm$^2$ |

EXAMPLE 3

In accordance with the method described in Example 1, a prepolymer was produced from 400 grams (0.2667 mole) of a mixture of polytetrahydrofuran 1000 and 2000 with an average molecular weight of 1500 and 140 grams (0.53 mole) of 4,4'-diisocyanato-1,2-diphenylethane the product had an isocyanate content of 4 percent in a viscosity of 2600 mPas at 90° C.

Three hundred (300) grams of this prepolymer were foamed with 4.4 grams of the above-described aqueous emulsifier solution and 0.01 gram of triethylenediamine. The mixing temperature was 100° C., the mold temperature was 100° C., and the molded part was post heated at 80° C. for 24 hours.

The resultant molded part had the following properties:

| Density | 500 grams/liter |
|---|---|
| Compression Strength | |
| at 20% Compression | 38 N/cm$^2$ |
| at 40% Compression | 70 N/cm$^2$ |
| at 60% Compression | 175 N/cm$^2$ |

The embodiments of the invention in which an exclusive privilege or property is claimed are defined as follows:

1. In a process for the manufacture of molded cellular polyurethane elastomers by reacting (a) an organic polyisocyanate with (b) higher molecular weight polyhydroxyl compounds and (c) water as well as possibly (d) chain extenders in the presence of (e) auxiliaries and/or additives wherein the improvement comprises using 4,4'-diisocyanato-1,2-diphenylethane or diisocyanato-1,2-diphenylethane isomer mixtures containing more than 95 percent by weight of 4,4'-diisocyanato-1,2-diphenylethane as the organic polyisocyanate.

2. The process of claim 1 comprising
   (i) preparing initially a prepolymer with an isocyanate content of 2 to 20 percent by weight by reaction of 4,4'-diisocyanato-1,2-diphenylethane or a diisocyanato-1,2-diphenylethane isomer mixture containing at least 95 percent by weight of 4,4'-diisocyanato-1,2-diphenylethane and the higher molecular weight polyhydroxyl compounds and
   (ii) reacting the resultant prepolymer in a second reaction step with water or a mixture of water and chain extenders.

3. The process of claim 1 comprising
   (i) preparing initially a prepolymer with an isocyanate content of 2 to 20 percent by weight by reaction of 4,4'-diisocyanato-1,2-diphenylethane or a diisocyanato-1,2-diphenylethane isomer mixture containing at least 95 percent by weight of 4,4'-diisocyanato1,2-diphenylethane and a part of the higher molecular weight polyhydroxyl compound and
   (ii) reacting the resultant prepolymer in a second reaction stage with a mixture of the remainder of the higher molecular weight polyhydroxyl compound and water or a mixture of the remainder of the higher molecular weight polyhydroxyl compound, water and a chain extender.

4. The process of claim 1 wherein the ratio of the isocyanate groups of component (a) to Zerewitinoff active hydrogen atoms of components (b), (c) and (d) is 0.8 to 1.3.

5. The process of claim 1 wherein the amount of water used is up to 5 percent by weight relative to the overall weight of components (a), (b) and (d).

6. The process of claim 1 wherein 0 to 0.3 mole of chain extender is used per 1 mole of higher molecular weight polyhydroxyl compound.

7. The process of claim 1 wherein aliphatic diols and/or possibly substituted aromatic diamines having molecular weights of 60 to 500 are used as chain extenders.

8. The process of claim 1 wherein the cellular polyurethane elastomers have densities of 250 to 800 grams per liter.

9. The cellular polyurethane elastomer prepared by the process of claim 1, 2, 3, 4, 5, 6, 7 or 8.

* * * * *